(12) United States Patent
Seaward

(10) Patent No.: US 10,027,598 B2
(45) Date of Patent: Jul. 17, 2018

(54) PROVIDING NETWORK RESOURCES BASED ON AVAILABLE USER INFORMATION

(71) Applicant: Accenture Global Services Limited, Dublin (IE)

(72) Inventor: Leona Seaward, Oxfordshire (GB)

(73) Assignee: Accenture Global Services Limited, Dublin (IE)

( * ) Notice: Subject to any disclaimer, the term of this patent is extended or adjusted under 35 U.S.C. 154(b) by 313 days.

(21) Appl. No.: 14/707,746

(22) Filed: May 8, 2015

(65) Prior Publication Data

US 2016/0330133 A1 Nov. 10, 2016

(51) Int. Cl.
*G06F 15/16* (2006.01)
*H04L 12/911* (2013.01)
*H04L 29/08* (2006.01)

(52) U.S. Cl.
CPC .............. *H04L 47/78* (2013.01); *H04L 67/02* (2013.01); *H04L 67/306* (2013.01)

(58) Field of Classification Search
CPC ........ H04L 47/78; H04L 67/02; H04L 67/306
USPC ........................................................ 709/217
See application file for complete search history.

(56) References Cited

U.S. PATENT DOCUMENTS

| 5,894,554 | A | 4/1999 | Lowery | |
|---|---|---|---|---|
| 6,640,244 | B1* | 10/2003 | Bowman-Amuah | ... G06F 9/466 707/999.01 |
| 6,766,298 | B1 | 7/2004 | Dodrill | |
| 6,901,438 | B1* | 5/2005 | Davis | ................... G06F 11/3414 707/E17.116 |
| 8,666,835 | B2 | 3/2014 | Minnis | |
| 8,719,105 | B2 | 5/2014 | Minnis | |
| 2002/0062342 | A1* | 5/2002 | Sidles | .................... G06F 17/243 709/203 |
| 2005/0245241 | A1* | 11/2005 | Durand | .................. G06Q 30/02 455/414.1 |
| 2008/0167068 | A1* | 7/2008 | Mosleh | ................. G06F 19/322 455/553.1 |
| 2010/0030578 | A1* | 2/2010 | Siddique | ............ G06Q 10/0637 705/3 |
| 2013/0215116 | A1* | 8/2013 | Siddique | ............ G06Q 30/0643 345/420 |
| 2014/0066476 | A1* | 3/2014 | Shen | ..................... C04B 35/632 514/307 |

* cited by examiner

*Primary Examiner* — Phuoc Nguyen
(74) *Attorney, Agent, or Firm* — Fish & Richardson P.C.

(57) ABSTRACT

Methods, systems, and apparatus, including computer programs encoded on a computer storage medium, for providing network resources based on available user information. The methods, systems, and apparatus include actions of obtaining a set of user information, receiving a request to access a network resource, and in response to receiving the request to access the network resource, determining user information requested by the network resource. Additional actions include determining whether the set of user information satisfies the user information requested by the network resource and in response to determining that the set of user information satisfies the user information requested by the network resource, selecting a particular network resource to provide in response to the request. Further actions include in response to selecting the particular network resource, providing the particular network resource in response to the request.

15 Claims, 4 Drawing Sheets

PROVIDING NETWORK RESOURCES BASED ON AVAILABLE USER INFORMATION

TECHNICAL FIELD

This disclosure generally relates to communications networks, and particularly to providing network resources based on available user information.

BACKGROUND

Communications networks such as the Internet allow users to retrieve network resources, such as web pages provided by web servers connected to the network, using computing devices connected to the network. In some cases, the web servers may collect and store information about the user or the computing device used to retrieve the network resource. This information may include demographic information explicitly provided by the user (e.g., user's age, sex, etc.) and information about the computing device (e.g., operating system, manufacturer, etc.).

SUMMARY

In general, an aspect of the subject matter described in this specification may involve a process for providing network resources, e.g., web pages, based on available user information. The system may include a server that obtains user information for a particular user and receives a request to access a particular network resource. For example, the user information may include a name, gender, and address, and the request to access a network resource may be a request to access a web page with a form in which the user provides the user's name and address. In response to the request to access a particular network resource, the system may determine that information about the user requested by the particular network resource is already available from the user information obtained by the server, and instead provide another network resource. For example, the system may determine that a web page requests a user's name and address for which the server has already obtained information for the user, and in response, provide a network resource that is typically provided to a user after the user enters a name and address in the webpage.

In some aspects, the subject matter described in this specification may be embodied in methods that may include the actions of obtaining a set of user information, receiving a request to access a network resource, and in response to receiving the request to access the network resource, determining user information requested by the network resource. Additional actions include determining whether the set of user information satisfies the user information requested by the network resource and in response to determining that the set of user information satisfies the user information requested by the network resource, selecting a particular network resource to provide in response to the request. Further actions include in response to selecting the particular network resource, providing the particular network resource in response to the request.

Other versions include corresponding systems, apparatus, and computer programs, configured to perform the actions of the methods, encoded on computer storage devices.

These and other versions may each optionally include one or more of the following features. For instance, in some implementations determining user information requested by the network resource includes identifying one or more fields in a form in the network resource and determining user information requested for the one or more fields as the user information requested by the network resource. In certain aspects, determining user information requested for the one or more fields as the user information requested by the network resource includes identifying metadata in the network resource, where the metadata describes user information requested for the one or more fields in the form in the network resource.

In some aspects, determining user information requested by the network resource includes determining a first type of user information requested by the network resource and determining a different, second type of user information requested by the network resource.

In some implementations, determining whether the set of user information satisfies the user information requested by the network resource includes determining one or more types of user information requested by the network resource and determining whether the set of user information includes user information that correspond to the one or more types of user information requested by the network resource.

In some aspects, determining whether the set of user information satisfies the user information requested by the network resource includes generating a form with one or more fields based at least on code in the network resource, populating the one or more fields of the form with at least a portion of the set of user information, submitting the form with the populated one or more fields, and determining whether the set of user information satisfies the user information requested by the network resource based on whether the form is successfully submitted.

In certain aspects, selecting a particular network resource to provide in response to the request includes selecting to provide a particular network resource that is different from the network resource for which access is requested. In some aspects, the request to access a network resource indicates a particular universal resource locator associated with the network resource.

In some implementations, providing the particular network resource includes generating a web page associated with the particular network resource, wherein the generated web page is populated with at least a portion of the user information requested by the network resource. In certain aspects, obtaining the set of user information includes obtaining at least a portion of the set of user information after determining whether the set of user information satisfies the user information requested by the network resource.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Network resources, such as web pages, may request that a user enter particular information. For example, a web page provided to a purchaser of an item may include a Hypertext Markup Language (HTML) form for the purchaser to enter information in order to make the purchase, such as the purchaser's name, address, and payment information. Once the purchaser enters the requested information and submits the form, the server that provided the web page may use the entered information to complete the purchase. Such an approach relies on the user to enter their information manually into the web page, which may be time-consuming and inefficient.

Accordingly, the present disclosure describes techniques for providing network resources based on available user information. One example method includes obtaining a set of user information, and receiving a request to access a network resource. In response to the request, user information requested by the network resource is determined. A determination is made whether the set of user information satisfies the user information requested by the network resource. If the set of user information satisfies the user information requested by the network resource, a particular network resource to provide in response to the request is selected and provided in response to the request.

The techniques described herein may provide the following advantages. The server may avoid providing a network resource requested when user information requested by the network resource is already available the server. Accordingly, the system may allow users to more efficiently use services provided by the server. The system may further reduce the amount of data traffic between the server and a user device, and may reduce the risk that the user's information may be stolen while the user's information is being transmitted from the user device to the server. User information can be provided automatically to a seller and earlier on in a transaction than user information is typically used. For example, usually a purchaser may not disclose information to the seller until the time to pay, whereas the system may allow a user to provide the information easily much earlier.

Figure 1:
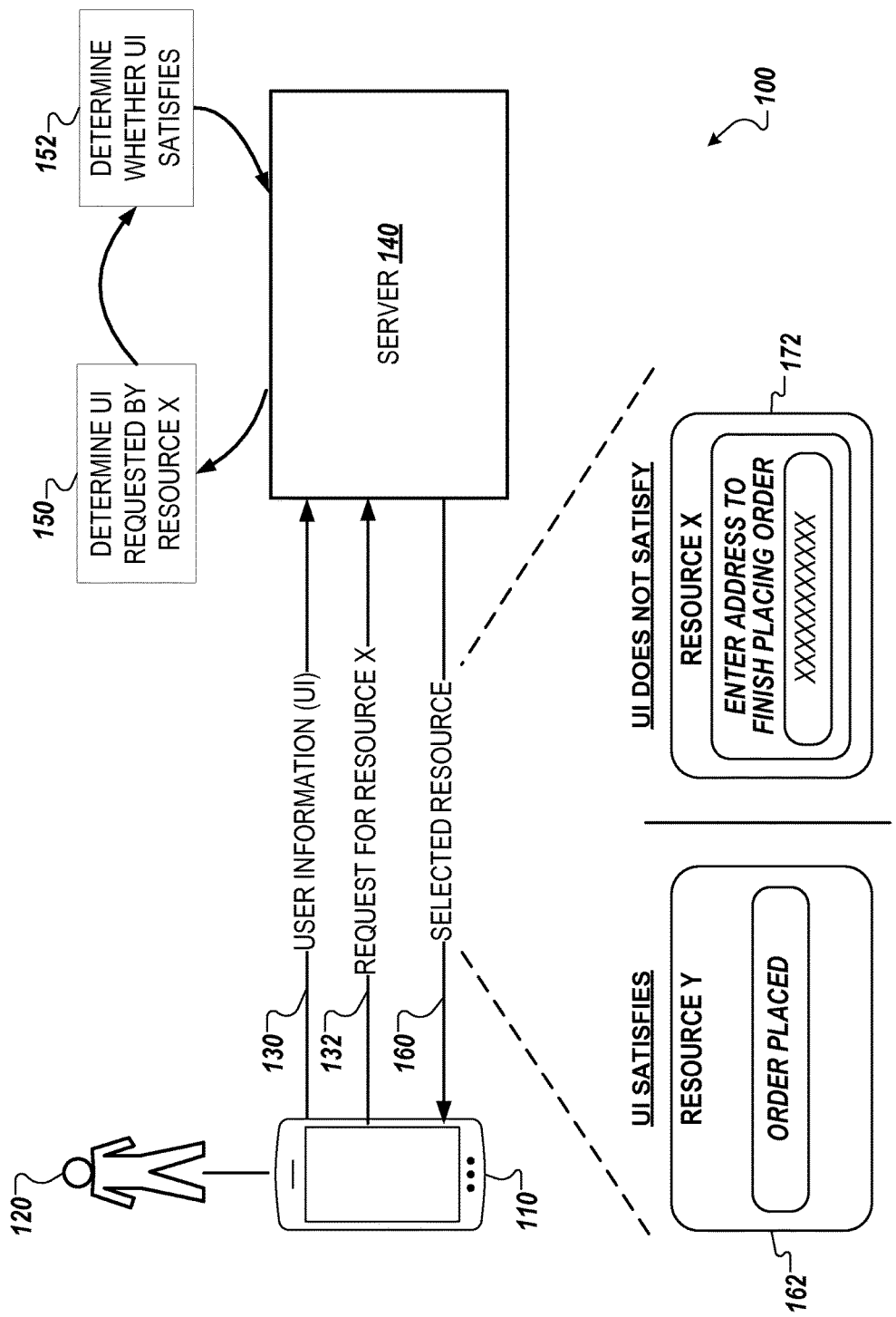
FIG. 1 is a block diagram of an example system for providing network resources based on available user information.

FIG. 1 is a block diagram of an example system 100 for providing network resources based on available user information. As described in further detail below, the system 100 includes a user device 110 and a server 140. In operation, the user device 110 sends user information (130) and a request for a particular network resource X (132) to the server 140. The server 140 determines the user information requested by the particular network resource X (150) and determines whether the user information provided by the user device 110 satisfies the user information determined to be requested by the particular network resource X (152). The server 140 responds to the user device 110 with a selected resource (160) based on this determination. If the server 140 determines that the user information satisfies the information requested by the particular network resource X, the server 140 selects network resource Y 162 as the selected resource. If the server 140 determines that the user information does not satisfy the information requested by the particular network resource X, the server 140 selects network resource X 172 as the selected resource.

The user device 110 may be a computing device used by the user 120. For example, the user device 110 may be a mobile computing device, a desktop computer, a laptop computer, a tablet computer, or some other type of computing device. The user device 110 may be used by the user 120 to provide user information to the server 140 (130) and provide a request for a network resource to the server 140 (132).

The user information may include a user's date of birth, residence address, occupation, gender, brand preferences, hobbies, or other personal information. The user device 110 may provide an interface to the user 120 through which the user 120 may enter user information and designate at least a portion of the user information be provided to the server 140. For example, the user device 110 may display a form where the user may fill in the user's name, full residence street address, gender, and occupation and enter preferences to designate to provide the user's name, city and state of residence, and gender to the server 140 when requesting any network resource from the server 140, and store the user information and preferences on the user device 110.

The user device 110 may determine from the stored preferences that when providing a request to access a network resource to the server 140, the user device 110 should also provide the user information. For example, the user device 110 may determine that the user device 110 is providing a request to server 140, and in response, also provide the user information to the server 140 either in the request, before the request, or after the request. In some implementations, the request to access a network resource may indicate a particular universal resource locator associated with the network resource. The stored preferences may indicate that different subsets of the user information are to be provided to different servers. For example, the stored preferences may specify that server 140 is to be provided with the full set of user information, while a different server is to be provided with only a subset of the user's information, such as the user's date of birth and gender, and another server is to be provided a less detailed version of a set of data, such as an age range instead of a date of birth.

In some implementations, the user device 110 may provide the user information 130 to the server 140 before the user device 110 determines to provide the request to the server 140. For example, the user device 110 may provide the server 140 user information when the user 120 enters information into the user device 110. Accordingly, the server 140 may later use the user information when the server 140 receives a request for a network resource for the user 120 from the user device 110.

The user device 110 may provide the request for a network resource in response to the user 120 interacting with the user device 110. For example, the user 120 may use an application executing on the user device 110 that renders a web page and click on a "Checkout" button that directs to a web page for providing a user's name and address for completing a checkout process. The user device 110 may detect the click on the "Checkout" button and, in response, determine to provide a request for the web page, that requests the user's name and address, to the server 140.

In some cases, the request for the network resource may include a Hypertext Transfer Protocol (HTTP) request sent from the user device 110 to the server 140 over a communications network, such as an HTTP GET message including a Uniform Resource Locator (URL) of the requested network resource. In some implementations, the request for the network resource may include the user information, such as, for example, in the header of an HTTP GET message. The user information may also be sent in a separate message from the request for the network resource, such as, for example, an HTTP POST or HTTP PUT message sent before or after the request for the network resource. In some cases, the user information may be sent using a different network protocol than the request for the network resource. The user information may be encoded in a particular data format, such as, for example, JavaScript Object Notation (JSON), Extensible Markup Language (XML), a proprietary format, or other formats. Such an encoding of the user information may be included inside a message encoded according to another protocol, such as, for example, an HTTP GET, POST or PUT message.

In response to providing the request for the network resource, the user device 110 may either receive the requested network resource or receive another network resource from the server 140, as shown at 160 in FIG. 1. For example, the user device 110 may provide the server 140 a request for resource X and in response resource Y 162 or resource X 172. The functionality described above for the user device 110 may be provided in a standalone application, a browser add-on, or other type of application.

The server 140 may be a computing device that provides network resources the user device 110. For example, the server 140 may be a web page server of a company. The server 140 may obtain user information for a user and receive a request for a resource. For example, the server 140 may obtain the user information by receiving the user information in the request for the resource received from the user device 110.

The server 140 may determine user information requested by a network resource (150). For example, the server 140 may determine that network resource X requested by the user device 110 requests a user's name and address. The server 140 may determine user information requested by the network resource based on virtually rendering the network resource. For example, in response to receiving a request for network resource X, the server 140 may virtually render network resource X, identify fields for name and address in a form in the virtually rendered network resource X, and determine the user information requested by the fields in the form. In some cases, the server 140 may determine user information requested by the network resource based on analyzing code encoding the network resource. For example, in response to receiving a request for network resource X, the server 140 may analyze code encoding the network resource X to identify that the code would render user input fields for name and address in network resource X. The server 140 may also determine user information requested by the network resource based on metadata for the network resource. For example, in response to receiving a request for network resource X, the server 140 may analyze metadata for the network resource X that describes the user information requested by network resource X.

After determining user information requested by the resource, the server 140 determines whether the user information obtained by the server 140 for the user 120 satisfies the user information requested by the resource (152). For example, the server 140 may determine whether the user information of name and address received from the user device 110 in the request for the network resource X satisfies the name and address requested by network resource X.

The server 140 may determine whether the user information obtained by the server 140 for the user 120 satisfies the user information requested by the resource based on determining the types of user information requested by the network and determining whether the user information obtained for the user includes information of the same type requested by the resource. For example, the server 140 may determine that the network resource X requests user information of the type name and the type address, in response, determine that the name and address for the user received in the request for network resource X are of the same types of name and address, and in response, determine that the user information obtained satisfies the user information requested. In another example, the server 140 may determine that network resource Z requests user information of the type name and the type social security number, in response, determine that the name received in the request for network resource Z matches the type of name but no user information is available that matches the type of social security number, and in response, determine that the user information obtained does not satisfy the user information requested.

In some implementations, the server 140 may determine whether the set of user information satisfies the user information requested by the network resource based on virtually rendering the network resource. For example, the server 140 may determine that a name and address satisfy user information requested by a web page based on virtually rendering a webpage including a form that requests a name and address. In determining whether the set of user information satisfies the user information requested by the network resource based on virtually rendering the network resource, the server 140 may generate a form with one or more fields based at least on code in the network resource, populate the one or more fields of the form with at least a portion of the set of user information, submit the form with the populated one or more fields, and determine whether the set of user information satisfies the user information requested by the network resource based on whether the form is successfully submitted. For example, the server 140 may generate a form that includes fields for name and address based on HTML code for a webpage, populate the fields for name and address with a set of user information that includes the name and address, submit the populated form, and determine that the set of user information satisfies the user information requested by the webpage based on determining that the submission of the form results in providing a different network resource. The server 140 may determine that a submission of a form is successful based on determining that the submission results in one or more of proceeding to another network resource, does not result in a notification that the submission failed, or does not result in a notification to change information populated in the form.

In response to determining that the user information requested by the network resource is satisfied by the user information received from the user device 110, the server 140 may select a particular network resource and provide the particular network resource 162 to the user device 110 (160). For example, in response to determining that the name and address requested by network resource X are satisfied by the name and address information included in the request, the server 140 may input the name and address into the respective fields in virtually rendered network resource X, and virtually click on a submit button and provide the network resource Y corresponding to an order acknowledgment to the user device 110. In some cases, the server 140 may internally simulate the receipt of a message that would be sent by the user device 110 if the submit button were activated with the user information in the respective fields of the resource (e.g., an HTTP POST message including the user information). The server 140 may then provide the network resource Y to the user device 110 as if the form had actually been submitted by the user.

In another example, in response to determining that a name and address requested by network resource X are satisfied by the name and address included in the request, the server 140 may provide a resource Y that is modified version of network resource X where the values for the fields of name and address are pre-filled with the name and address that the server 140 received from the user device 110 in the request. In yet another example, in response to determining that a name and address requested by network resource X are satisfied by the name and address included in the request, the server 140 may update session variables for the name and address and provide a resource Y that is a next resource in a sequence of multiple pages for placing an order. In some cases, in response to determining that a name and address requested by network resource X are satisfied by the name and address included in the request, the server 140 may send a response to the user device 110 redirecting it to a URL associated with network resource Y. For example, the server 140 may send an HTTP 403 redirect response to the user device 110 including the URL for network resource Y, and the user device 110 may, in turn, send a subsequent request to the server 140 for network resource Y.

In response to determining that the user information requested by the network resource are not satisfied, the server 140 may provide the requested network resource to the user device 110 (170). For example, in response to determining that name and address requested by network resource X are not satisfied by a name with no address included in the request, the server 140 may provide network resource X requesting an address from the user.

Different configurations of the system 100 may be used where functionality of the user device 110 and the server 140 may be combined, further separated, distributed, or interchanged.

Figure 2:
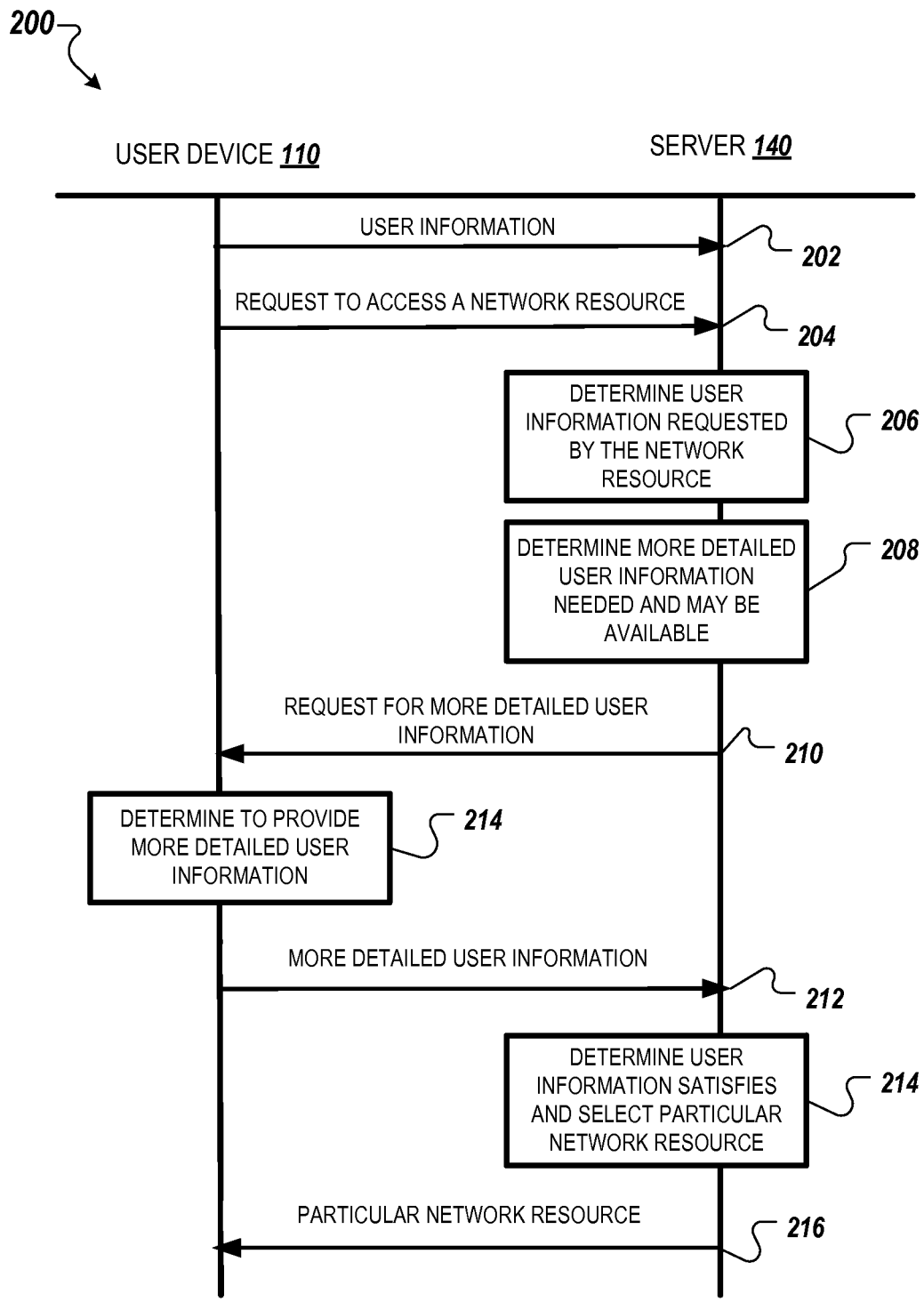
FIG. 2 is an interaction diagram of an example interaction of providing network resources based on available user information.

FIG. 2 is an interaction diagram 200 of an example interaction of providing network resources based on available user information. The following describes the interaction as being performed by components of the system 100 that are described with reference to FIG. 1. However, the interaction may be performed by other systems or system configurations.

At 202, the user device 110 provides user information to the server 140. For example, the user device 110 may store a user's name and full street address and based on the user's preferences, provide the server 140 a set user information including name and city and state of residence, but not street address, of the user.

At 204, the user device 110 provides a request to access a network resource to the server 140. For example, the user device 110 may provide a request to access network resource X to the server 140. The user device 110 may provide the set user information to the server 140 in the request, may provide the set of user information and the request at substantially the same time, or provide the request at a later point in time independently of when the user information was provided to the server 140.

At 206, the server 140 may determine the user information requested by the network resource. For example, the server 140 may receive the request for network resource X, virtually render network resource X, and determine that network resource X requests a user's name and full street address.

At 208, the server 140 determines that more detailed user information is needed and may be available from the user device 110. For example, the server 140 may determine that the user information requested by network resource X is not satisfied as the full street address of the user is not in the set of user information, but also determine that because the city and state of residence for the user is in the set of user information, the full street address may be available to the user device 110.

The server 140 may determine that more detailed user information may be available based on determining that the set of information includes a less detailed version of the user information. For example, the server 140 may determine that the set of user information includes an age range or age of the user, and in response, determine that the user device 110 may have available the exact birthday of the user. In another example, the server 140 may determine that the set of user information includes a state of residence of the user, and in response, determine that the user device 110 may have a zip code of residence for the user.

In another example, the server 140 may determine that more detailed user information may be available based on an indication by the user device 110. For example, the request from the user device 110 may indicate for which types of user information the user device 110 has more detailed information available. In another example, the request from the user device 110 may indicate availability of particular types of information and a particular level of detail available for those types of information. In a particular example, the request may include an indication that the user device 110 has residence information available, and that this residence information includes full street address information. In another particular example, the request may include an indication that the user device 110 has age information available, and that this age information includes up to a specific age for the user. In yet another example of indications, the request from the user device 110 may generally indicate that the request is originating through a service that may provide less detailed user information to the server 140 than is available to the user device 110.

At 210, in response to determining that more detailed user information is needed and may be available to the user device 110, the server 140 may provide a request for more detailed information to the user device 110. For example, the server 140 may provide the user device 110 a request for the full street address of the user.

At 214, in response to receiving the request for more detailed information, the user device 110 determines to provide more detailed user information to the server 140. For example, in response to receiving the request for the full street address of the user, the server may determine to provide the full street address of the user to the server 140. Such a determination may be based on the stored preferences discussed above, on prompting the user as to whether the additional information should be provided, or based on other factors. For example, in response to receiving the request for the user's full street address, the user device 110 may provide a prompt to the user asking the user whether the user would like to provide the user's full street address to the server 140, and in response to receiving input from the user indicating the user would like to provide the user's full street address to the server 140, determine to provide the user's full street address to the user.

In another example, the user device 110 may determine not to provide more detailed user information in response to receiving the request for the user's full street address, providing a prompt to the user asking the user whether the user would like to provide the user's full street address to the server 140, and receiving input from the user indicating the user would not like to provide the user's full street address to the server 140.

The user device 110 may further determine to provide more detailed information to the server 140 based on determining whether the user device 110 has the more detailed information available. For example, in response to receiving the request for the user's full street address, the user device 110 may first determine whether the user device 110 has a full street address available for the user.

If the user device 110 determines that the user device 110 does not have the more detailed information available, the user device 110 may determine not to prompt the user for the more detailed information and instead provide an indication to the server 140 that the more detailed information is available. For example, in response to receiving a request for a user's full street address and determining that the user device 110 does not have the full street address of the user stored, the user device 110 may determine not to provide a prompt to the user asking if the user device 110 may share the user's full street address, and instead, provide an indication to the server 140 that the full street address is not available to the user device 110.

If the user device 110 determines that the user device 110 does have the more detailed information available, the user device 110 may determine to provide the prompt the user for the more detailed information. For example, in response to receiving a request for a user's full street address and determining that the user device 110 does have the full street address of the user stored, the user device 110 may determine to provide a prompt to the user asking if the user device 110 may share the user's full street address.

The user device 110 may further determine to provide more detailed information to the server 140 based on determining whether the server 140 has previously requested the more detailed user information. For example, in response to receiving the request for the user's full street address, the user device 110 may first determine whether the server 140 has previously requested full street address for the user.

If the user device 110 determines that the server 140 did not previously request the more detailed information, the user device 110 may determine to provide the prompt the user for the more detailed information. For example, in response to receiving a request for a user's full street address and determining that the server 140 had not previously requested the full street address of the user, the user device 110 may determine to provide a prompt to the user asking if the user device 110 may share the user's full street address. If the user device 110 determines that the server 140 requested the more detailed information before, the user device 110 may determine not to prompt the user for the more detailed information and instead provide an indication to the server 140 that the more detailed information is not available. For example, in response to receiving a request for a user's full street address and determining that the server 140 previously requested the full street address of the user, the user device 110 may determine not to provide a prompt to the user asking if the user device 110 may share the user's full street address, and instead, provide an indication to the server 140 that the full street address is not available to the user device 110.

At 212, in response to determining to provide more detailed information, the user device 110 provides the more detailed user information to the server 140. For example, in response to determining to provide a full street address of the user, the user device 110 may provide the full street address of the user to the server 140.

At 214, in response to receiving the more detailed user information, the server 140 determines that the user information now satisfies the user information requested by the resource requested and select a particular resource to provide the user device 110. For example, in response to determining that the name and full street address of the user satisfies the user information requested by the network resource X, the server 140 may select to provide network resource Y to the user device 110.

At 216, in response to selecting a particular resource to provide the user device 110, the server 140 provides the particular resource to the user device 110. For example, in response to selecting to provide network resource Y to the user device 110, the server 140 may provide network resource Y to the user device 110.

Figure 3:
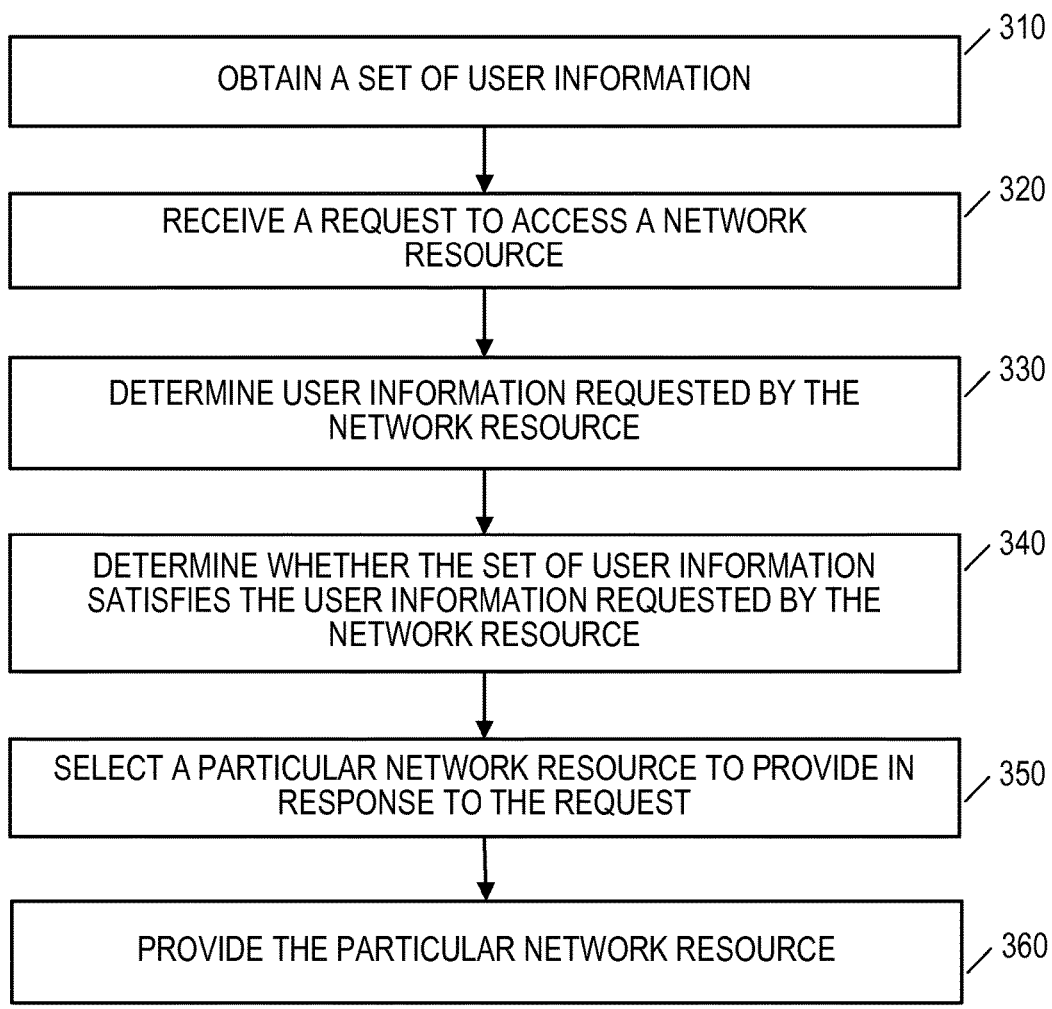
FIG. 3 is a flowchart of an example process for providing network resources based on available user information.

FIG. 3 is a flowchart of an example process 300 for providing network resources based on available user information. At 310, a set of user information is obtained. In some cases, obtaining the set of user information includes obtaining at least a portion of the set of user information after determining whether the set of user information satisfies the user information requested by the network resource.

At 320, a request to access a network resource is received. In some cases, the request indicates a particular universal resource locator associated with the network resource.

At 330, in response to receiving the request to access the network resource, user information requested by the network resource is determined. In some cases, determining user information requested by the network resource includes identifying one or more fields in a form in the network resource and determining user information requested for the one or more fields as the user information requested by the network resource. In some cases, determining user information requested for the one or more fields as the user information requested by the network resource includes identifying metadata in the network resource, where the metadata describes user information requested for the one or more fields in the form in the network resource. In some cases, determining user information requested by the network resource includes determining a first type of user information requested by the network resource and determining a different, second type of user information requested by the network resource.

At 340, whether the set of user information satisfies the user information requested by the network resource is determined. In some cases, determining whether the set of user information satisfies the user information requested by the network resource includes determining one or more types of user information requested by the network resource and determining whether the set of user information includes user information that correspond to the one or more types of user information requested by the network resource.

At 350, in response to determining that the set of user information satisfies the user information requested by the network resource, a particular network resource is selected to provide in response to the request. In some cases, selecting a particular network resource to provide in response to the request includes selecting to provide a particular network resource that is different from the network resource for which access is requested.

At 360, in response to selecting the particular network resource, the particular network resource is provided in response to the request. In some cases, providing the particular network resource includes generating a web page associated with the particular network resource, where the generated web page is populated with at least a portion of the user information requested by the network resource.

Figure 4:
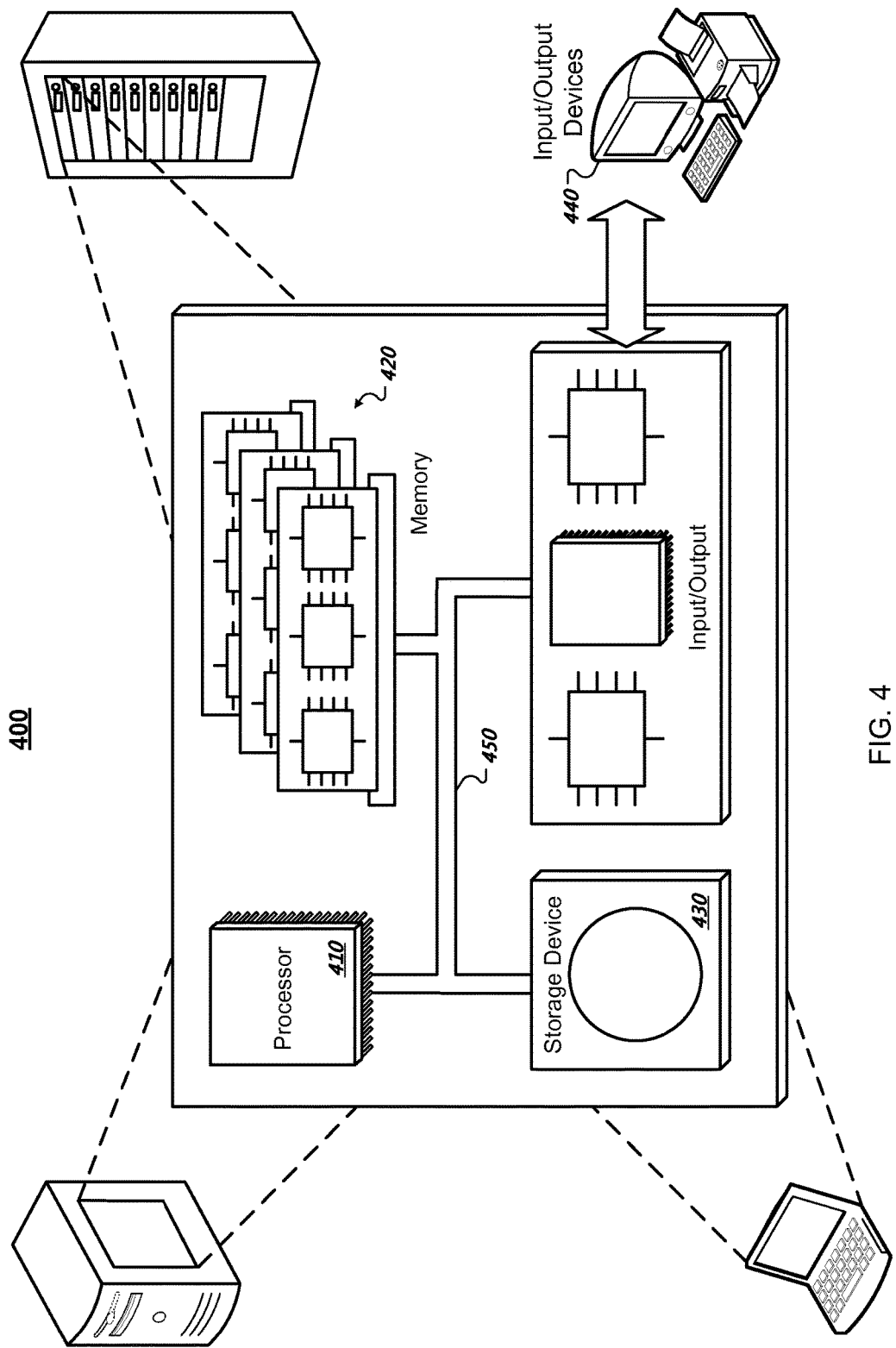
FIG. 4 illustrates a schematic diagram of an exemplary generic computer system.

FIG. 4 illustrates a schematic diagram of an exemplary generic computer system. The system 400 can be used for the operations described in association with the processes 300 according to some implementations. The system 400 may be included in the system 100.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). In some cases, the one or more programmable computers may be connected by a network to form a distributed computing environment (e.g., a cloud).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method executed by one or more processors, the method comprising:
    obtaining, by a web server, a set of user information;
    receiving, by the web server, after the web server obtains the set of user information, a request from a client device to access a particular web page;
    in response to receiving the request to access the particular web page, identifying, by the server through analysis of code that encodes the particular webpage, fields in a form in the particular webpage for which access is requested;
    determining, by the web server, user information requested by the fields identified in the form in the particular web page for which access is requested;
    determining, by the web server, whether the set of user information obtained prior to receiving the request to access the particular page satisfies the user information requested by the fields identified in the form in the particular web page for which access is requested; and
    in response to determining that the set of user information obtained prior to receiving the request to access the particular page satisfies the user information requested by the fields identified in the form in the particular web page for which access is requested, providing, by the web server, to the client device, and in response to the request to access the particular web page, a different web page to which the form in the particular web page links instead of providing the particular web page for which access is actually requested.

2. The method of claim 1, wherein determining user information requested by the fields identified in the form in the particular web page comprises:
    determining a first type of user information requested by a first field the form in the particular web page; and
    determining a different, second type of user information requested by a second field in the form in the particular web page.

3. The method of claim 1, wherein determining whether the set of user information obtained prior to receiving the request to access the particular page satisfies the user information requested by the fields identified in the form in the particular web page comprises:
    determining one or more types of user information requested by the fields identified in the form in the particular web page; and
    determining whether the set of user information includes user information that correspond to the one or more types of user information requested by the fields identified in the form in the particular web page.

4. The method of claim 1, wherein determining whether the set of user information obtained prior to receiving the request to access the particular page satisfies the user information requested by the fields identified in the form in the particular web page comprises:
    generating, by the web server, a form with the fields based at least on the code that encodes the particular web page;
    populating, by the web server, the fields of the form with at least a portion of the set of user information;
    submitting, by the web server, the form with the populated fields; and
    determining, by the web server, whether the set of user information satisfies the user information requested by the form in the particular web page based on whether the form is successfully submitted.

5. The method of claim 4, wherein determining whether the set of user information satisfies the user information requested by the form in the particular web page based on whether the form is successfully submitted comprises:
   determining whether submission of the form results in a different webpage instead of a notification that submission failed or a notification to change information populated in the form.

6. The method of claim 1, wherein the request to access a particular web page indicates a particular universal resource locator associated with the particular web page.

7. The method of claim 1, wherein obtaining the set of user information includes obtaining at least a portion of the set of user information after determining whether the set of user information satisfies the user information requested by the particular web page.

8. The method of claim 1, wherein providing, by the web server, to the client device, and in response to the request to access the particular web page, a different web page to which the form in the particular web page links instead of providing the particular web page for which access is actually requested, comprises:
   providing, by the web server, to the client device, and in response to the request to access the particular web page, a different web page to which the form in the particular web page would direct the client device after the user information is input into the form and the form is submitted, instead of providing the particular web page for which access is actually requested.

9. The method of claim 1, wherein identifying, by the server through analysis of code that encodes the particular webpage, fields in a form in the particular webpage for which access is requested comprises:
   identifying the fields by analyzing Hypertext Markup Language (HTML) code that encodes the form.

10. A system comprising:
   one or more computers; and
   one or more storage devices storing instructions that are operable, when executed by the one or more computers, to cause the one or more computers to perform operations comprising:
   obtaining, by a web server, a set of user information;
   receiving, by the web server, after the web server obtains the set of user information, a request from a client device to access a particular web page;
   in response to receiving the request to access the particular web page, identifying, by the server through analysis of code that encodes the particular webpage, fields in a form in the particular webpage for which access is requested;
   determining, by the web server, user information requested by the fields identified in the form in the particular web page for which access is requested;
   determining, by the web server, whether the set of user information obtained prior to receiving the request to access the particular page satisfies the user information requested by the fields identified in the form in the particular web page for which access is requested; and
   in response to determining that the set of user information obtained prior to receiving the request to access the particular page satisfies the user information requested by the fields identified in the form in the particular web page for which access is requested, providing, by the web server, to the client device, and in response to the request to access the particular web page, a different web page to which the form in the particular web page links instead of providing the particular web page for which access is actually requested.

11. The system of claim 10, wherein determining user information requested by the fields identified in the form in the particular web page comprises:
   determining a first type of user information requested by a first field the form in the particular web page; and
   determining a different, second type of user information requested by a second field in the form in the particular web page.

12. The system of claim 10, wherein determining whether the set of user information obtained prior to receiving the request to access the particular page satisfies the user information requested by the fields identified in the form in the particular web page comprises:
   determining one or more types of user information requested by the fields identified in the form in the particular web page; and
   determining whether the set of user information includes user information that correspond to the one or more types of user information requested by the fields identified in the form in the particular web page.

13. The system of claim 10, wherein the request to access a particular web page indicates a particular universal resource locator associated with the particular web page.

14. The system of claim 10, wherein providing the web page includes generating a web page populated with at least a portion of the user information requested by the particular web page.

15. A non-transitory computer-readable medium storing software comprising instructions executable by one or more computers which, upon such execution, cause the one or more computers to perform operations comprising:
   obtaining, by a web server, a set of user information;
   receiving, by the web server, after the web server obtains the set of user information, a request from a client device to access a particular web page;
   in response to receiving the request to access the particular web page, identifying, by the server through analysis of code that encodes the particular webpage, fields in a form in the particular webpage for which access is requested;
   determining, by the web server, user information requested by the fields identified in the form in the particular web page for which access is requested;
   determining, by the web server, whether the set of user information obtained prior to receiving the request to access the particular page satisfies the user information requested by the fields identified in the form in the particular web page for which access is requested; and
   in response to determining that the set of user information obtained prior to receiving the request to access the particular page satisfies the user information requested by the fields identified in the form in the particular web page for which access is requested, providing, by the web server, to the client device, and in response to the request to access the particular web page, a different web page to which the form in the particular web page links instead of providing the particular web page for which access is actually requested.

* * * * *